United States Patent [19]

Carlson et al.

[11] 4,130,259

[45] Dec. 19, 1978

[54] HELICOPTER COLLECTIVE LEVER

[75] Inventors: Floyd W. Carlson, Fort Worth; Joseph Mashman, Dallas, both of Tex.

[73] Assignee: Textron Inc., Providence, R.I.

[21] Appl. No.: 823,284

[22] Filed: Aug. 10, 1977

[51] Int. Cl.$^2$ .............................................. B64C 27/56
[52] U.S. Cl. ..................................... 244/83 F; 74/469
[58] Field of Search .............. 244/17.11, 17.25, 17.13; 74/469, 471 R, 479 R, 491, 492

[56] References Cited

U.S. PATENT DOCUMENTS

| | | | |
|---|---|---|---|
| 1,278,462 | 9/1918 | Harris | 244/234 |
| 2,505,020 | 4/1950 | Weisman | 244/234 |
| 2,589,030 | 3/1952 | Alde | 244/17.25 X |
| 3,288,395 | 11/1966 | Krohncke | 244/17.25 X |
| 3,543,599 | 12/1970 | Caswell | 74/469 |

*Primary Examiner*—Galen L. Barefoot
*Attorney, Agent, or Firm*—Richards, Harris & Medlock

[57] ABSTRACT

This invention relates to controls for helicopters and more particularly to an improved collective pitch lever system in which the pilot, lever and pivot orientation is such that the possibility of pilot-induced oscillations is greatly reduced. In a further aspect, a collective pitch lever is provided in which the operative elements are so located as to be logically related to the elements controlled thereby in their respective mountings on the airframe. Further, the collective lever is provided in which the pilot-input motion for given command is harmonious or compatible with corresponding pilot inputs in fixed-wing aircraft.

5 Claims, 4 Drawing Figures

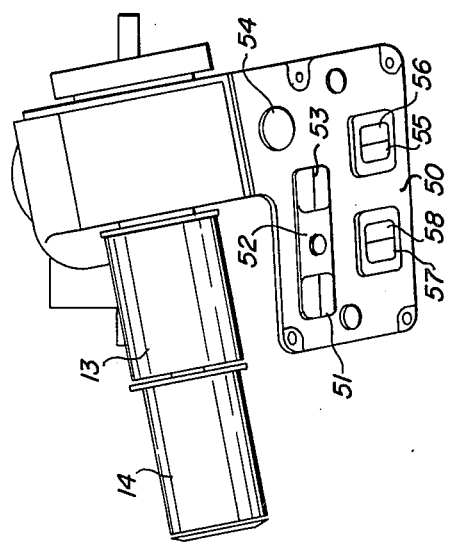
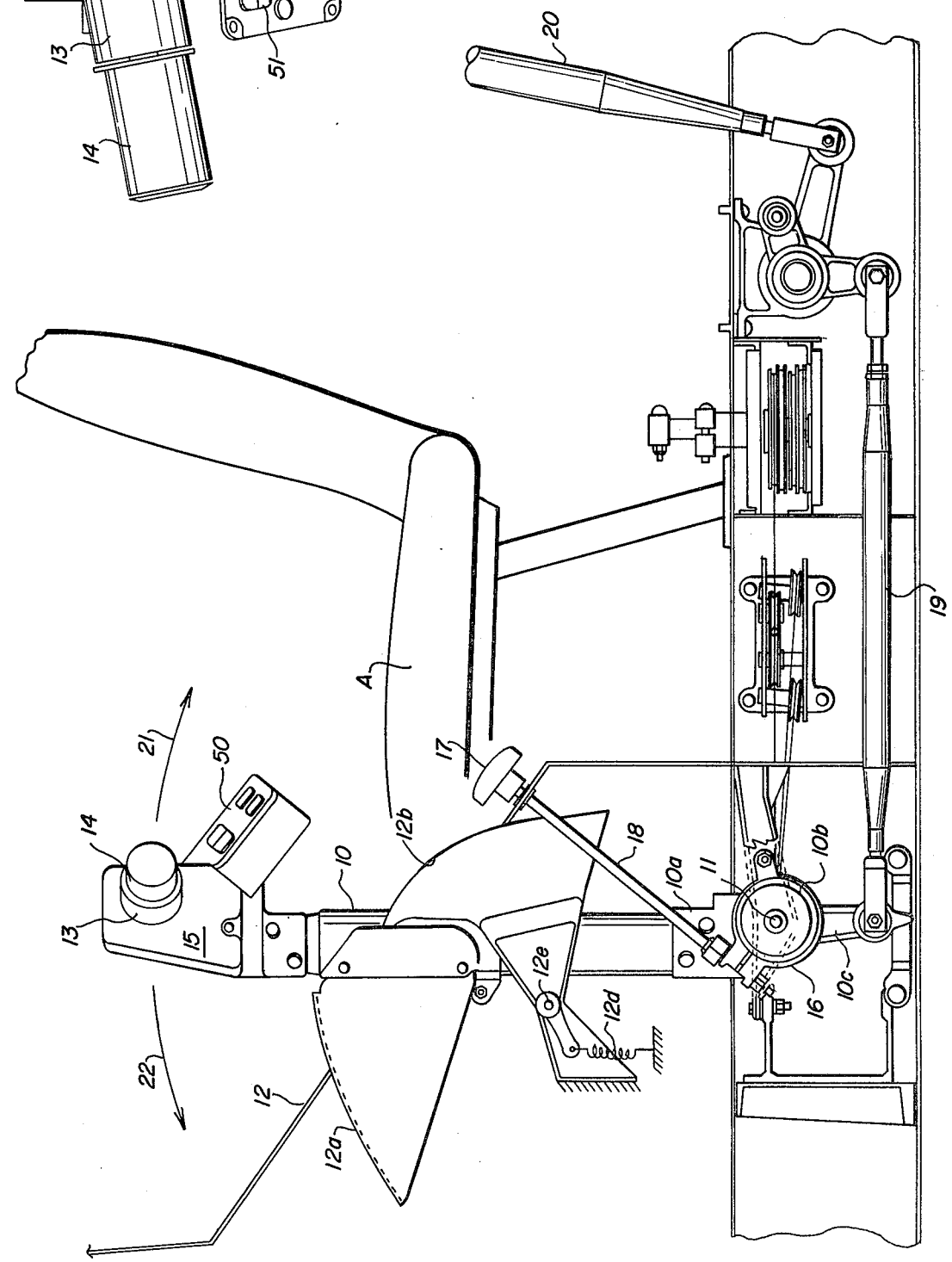

HELICOPTER COLLECTIVE LEVER

BACKGROUND OF THE INVENTION

The present invention is directed primarily to a collective lever construction and mounting for the purpose of overcoming problems heretofore found to be serious in the operation of helicopters. For example, collective levers are mounted at the left side of the pilot's seat. The lever pivot point is rearward of the pilot. The lever is operated by movement up and down to increase and decrease collective pitch, respectively. When a helicopter is flying with the blades out of track (or for other reasons), vertical oscillations may be generated in the aircraft which oscillations are not readily eliminated during flight. When such oscillations are present, the pilot is subject to the same forces which cause them. As the pilot grasps the collective lever to control collective pitch, oscillation forces are applied to the collective lever and comprise input commands that are undesirable to the aircraft.

Generally, the collective lever is supplied with throttle control for the engines. Dual engine aircraft would require two separate throttle controls on a collective lever. In the past the throttle controls, as rotatable cylinders, have been mounted with the cylinder axes coaxial with the collective lever and are coupled to the engines.

SUMMARY OF THE INVENTION

Thus, in accordance with the present invention, a helicopter collective lever is provided which involves means to mount the lever for fore/aft motion above a pivot to accommodate pilot inputs. Means are then coupled to the lever to transmit the fore/aft motion to change the collective main rotor pitch on the helicopter greatly to reduce the possibility of pilot induced oscillations thereof.

In accordance with a further aspect of the present invention, the throttle controls are mounted in a horizontal sequence extending laterally, relative to the longitudinal axis of the aircraft. Throttle controls for dual aircraft ship bear the same relative position in the cockpit as the right and left engines bear to each other on the aircraft fuselage.

DETAILED DESCRIPTION OF THE DRAWINGS

For a more complete understanding of the present invention, and for further details and advantages thereof, reference is now made to the following description taken in conjunction with the accompanying drawings in which:

FIG. 1 is a side view of a collective lever embodying the present invention;

FIG. 4 is a top view of the collective lever of FIG. 1.

DESCRIPTION OF THE PREFERRED EMBODIMENTS

Figure 2:
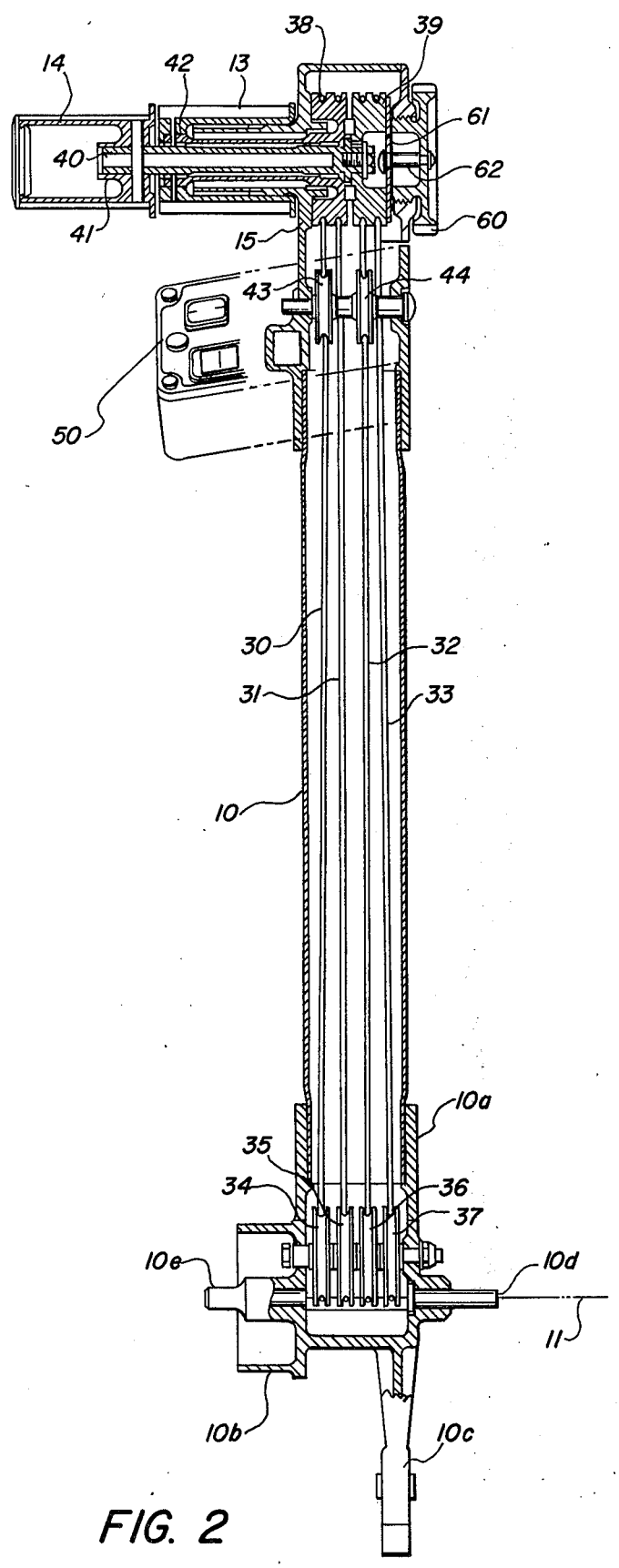
FIG. 2 is a sectional view taken along lines 2—2 of FIG. 1.

The present invention will be described in connection with a particular embodiment thereof which is illustrated in the drawings. Referring to FIG. 1, the invention is directed primarily to provision of a power of a collective lever that is so constructed and arranged as to greatly reduce the possibility of one of the inherent problems in prior art systems, namely pilot induced oscillations.

Collective levers heretofore used are pivoted back of the pilot. The free end is raised and lowered to increase and decrease collective pitch.

The present invention involves a collective lever 10 which is pivoted ahead of the pilot on axis 11. As shown in FIG. 1, the collective lever extends upwardly through the sloping top of a cockpit radial panel 12, the surface of which is indicated by a dotted line. The pilot generally is seated on seat A aft of the pivot point 11 so that with his left arm forward he can conveniently grasp the tandem mounted throttle controls 13 and 14. The throttle controls are actuated by the pilot's left hand. The upper end of the lever 10 is provided with a control box 15 with the throttle controls extending to the left of control box 15.

The lower end of the lever 10 is mounted in a fixture 10a which includes a drum 10b and a lower extension 10c. The drum 10b cooperates with a friction band 16 which may be loosened or tightened by rotating a knob 17 on a shaft 18 which extends downward through the radial panel 12. By this means, the pilot may control the static friction which opposes rotation of the lever 10 about the pivot 11.

The lower extension 10c is coupled by a suitable means such as the control tube 19 which in the embodiment here shown, is connected to actuate control tube 20 which moves the collective input controls on the swashplate mounting. Generally such motion is utilized by hydraulic booster mechanisms for ease of control by the pilot.

In operation, horizontal collective lever movement generally is indicated by the arrows 21 and 22. Such movement will serve to actuate tubes 19 and 20 thereby to change the collective pitch of the helicopter blades. The effective motion, in accordance with arrows 21 and 22, significantly differs from control movement normally employed in helicopters, i.e., control the motion generally in a vertical direction. With motion changing collective pitch as indicated by arrows 21 and 22, vibration or oscillation of the aircraft such as due to blades being out of track will not be reflected in movements of the linkages 19 and 20. Rather, because the vibrations generally are vertical, the vertical lever 10 will not be subject to change of the collective command by reason of vertical accelerations.

Figure 3:
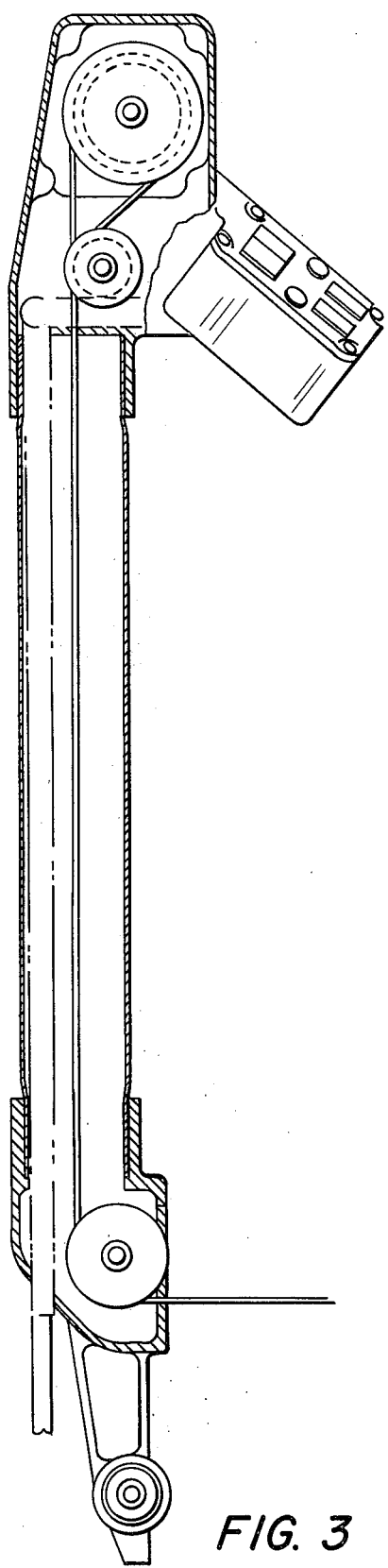
FIG. 3 is a sectional view taken along lines 3—3 of FIG. 2.

As illustrated in FIGS. 2 and 3, lever 10 is provided with shafts 10d and 10e, the axes of which correspond with the axis 11, FIG. 1. The lever 10 is a hollow tube through which four tables 30–33 extend. At the bottom of the housing 10a the cables 30–33 pass around pulleys 34–37, respectively. However, in the upper end of the tube 10 the cables 30–33 extend into the control box 15 where they pass over pulleys 38 and 39. A shaft 40 is journaled in the control housing 15 and extends horizontally into the left of the upper end of the control box 15. A pulley 39 is secured to an inner sleeve 41 mounted on a shaft 40. The left engine throttle control 14 is mounted on sleeve 41 and extends in a driving relation to the pulley 39. Rotation of the throttle control cylinder 14 rotates the sleeve 41 which rotates the pulley 39. This causes the cable sections 32 and 33 to move in opposite directions as they wrap around the pulley 39.

In a similar manner, the right engine throttle control 13 is mounted to be integral with an outer sleeve 42. The outer sleeve 42 is mounted common to the pulley 38. Rotation of the righthand throttle control cylinder 13 rotates the pulley 38 which moves cable sections 31 and 32. Cables 30 and 32 pass over idler pulleys 43 and 44, respectively. By this means, the pilot may increase or decrease the throttle settings for the lefthand and righthand engines independently of each other, the control inputs being transmitted by way of the cables 30–33 through the length of the collective lever and thence to the engines.

Switch panel 50 is provided immediately below the throttle controls 13 and 14, as viewed in FIG. 1. As viewed in FIGS. 2 and 3, the switch panel 50 extends downwardly at a slight angle relative to the axis of the shaft 40 and to the left of the collective lever 10. As shown in FIG. 4, the switch panel 50 includes a number of control switches which are readily accessible to the pilot and conveniently actuatable by thumb action. As shown in FIG. 4, landing light switch 51 is provided with an ON/OFF position. A searchlight ON/OFF switch 52 is provided immediately adjacent the landing light switch 51. An RPM selector or beeper switch 53 may be actuated in one direction to increase the rotor governor setting and in the other position to decrease the governor setting.

A switch 54 is provided to extend sweep left or right or stow a fuselage mounted searchlight. Thus, the switch 54 is a 4-position switch.

A pair of starter switches 55 and 56 are provided for starting engines 1 and 2, respectively, i.e., the lefthand and the righthand engines. Finally, switches 57 and 58 are provided for moving the idle stop permitting the engine to be shutdown by rotation of the throttle controls 13 and 14 beyond stops normally provided therefor.

Finally, in connection with the embodiment illustrated in FIGS. 1-4, controlled friction opposing rotation of the throttle controls 13 and 14 is provided by a knurled wheel 60 mounted as to apply pressure to a pressure plate 61 which bears against the righthand face of the pulley 39 which in turn causes the pulley 38 to bear against the innerface of the instrument of the control housing 15. Pressure plate 61 is free to rotate on a shaft 62 independently of the rotational input supplied through the knurled wheel 61.

Referring again to FIG. 1, it will be noted that the collective lever 10 extends upwardly from pivot axis 11 through the surface of the cockpit radial panel 12. The cockpit radial panel has a slot therein in which the lever 10 may operate. A follower baffle 12a is fastened to the lever 10. Baffle 12a has a curvature the center of which is at the axis 11. Thus, as the lever 10 moves in the directions of arrows 21 and 22, the slot in the panel 12 is covered forward of the lever 10.

A second baffle 12b is provided immediately aft of lever 10. Baffle 12b is pivoted at point 12c and is caused to follow lever 10 by the operation of the spring 12d. Thus, the slot aft of the lever 10 is always maintained covered. Use of baffles 12a and 12b prevents objects getting in the slot and upon becoming lodged therein as would otherwise prevent the free movement of the collective lever 10 as desired by the pilot.

Although only one embodiment of the invention, together with modifications thereof, has been described in detail herein and shown in the accompanying drawings, it will be evident to one of ordinary skill in the art that various further modifications are possible within the scope and spirit of the invention and it is intended to cover such modifications as fall within the scope of the appended claims.

What is claimed is:

1. In a helicopter collective pitch and control for the helicopter engine system control, the combination which comprises:
   (a) structure in a helicopter adjacent a pilot seat forming a horizontal pivot at about the cabin floor adjacent to and ahead of the pilot seat and having an axis lateral relative to the longitudinal axis of said helicopter,
   (b) a control lever mounted on said pivot normal to the longitudinal axis of said helicopter,
   (c) a throttle support extending generally parallel to said pivot away from said seat,
   (d) throttle means including at least one control on said support coupled through said lever to control the engine system, and
   (e) a control train extending from said lever to vary the collective main rotor pitch of said helicopter in dependence upon rotation of said lever about said pivot.

2. In a helicopter collective pitch and control for the helicopter engine system control, the combination which comprises:
   (a) structure in a helicopter adjacent a pilot seat forming a horizontal pivot at about the cabin floor level and having an axis lateral relative to the longitudinal axis of the helicopter,
   (b) a control lever mounted on said pivot generally normal to the longitudinal axis of the helicopter,
   (c) a throttle support extending parallel to said pivot and away from said pilot seat,
   (d) throttle means having at least one control mounted on said support for controlling the helicopter engine system,
   (e) a switch panel mounted on said lever below said throttle means having at least one switch actuatable by thumb action when the fingers of a hand are gripping said throttle means, and
   (f) a control train extending from said lever to vary the collective main rotor pitch of said helicopter in dependence upon rotation of said lever about said pivot.

3. The combination as set forth in claim 2 wherein:
   (a) said throttle support comprises first and second coaxial support cylinders, and
   (b) said throttle means comprises first and second tandem mounted throttle controls for independently rotating said first and second coaxial support cylinders.

4. The combination as set forth in claim 3 further comprising:
   (a) a first pulley attached to said first support cylinder,
   (b) a second pulley adjacent to and tandemly coaxial with said first pulley and attached to said second support cylinder,
   (c) a plurality of cables wrapped around said first and second pulleys for moving in response to the rotation of said first and second throttle controls,
   (d) a pressure plate for engaging said first pulley to provide static friction resistance to the rotation of said first and second pulleys, and
   (e) a wheel slidably engaging said pressure plate for varying the static friction resistance to the rotation of said first and second pulleys.

5. The combination as set forth in claim 2 wherein said pivot is disposed generally forward of said pilot seat and said lever is disposed in a generally vertical orientation such that the collective main rotor pitch of said helicopter may be varied by moving said lever forward and backward in a generally horizontal direction.

* * * * *